United States Patent
Nam et al.

(10) Patent No.: US 12,269,009 B2
(45) Date of Patent: Apr. 8, 2025

(54) SUPER ABSORBENT POLYMER AND METHOD FOR PREPARING SAME

(71) Applicant: LG Chem, Ltd., Seoul (KR)

(72) Inventors: Hyemi Nam, Daejeon (KR); Sang Gi Lee, Daejeon (KR); Yeonsoo Kim, Daejeon (KR); Chang Hun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 941 days.

(21) Appl. No.: 17/258,660

(22) PCT Filed: Jan. 17, 2020

(86) PCT No.: PCT/KR2020/000852
§ 371 (c)(1),
(2) Date: Jan. 7, 2021

(87) PCT Pub. No.: WO2020/149691
PCT Pub. Date: Jul. 23, 2020

(65) Prior Publication Data
US 2021/0268475 A1    Sep. 2, 2021

(30) Foreign Application Priority Data

Jan. 17, 2019   (KR) .................. 10-2019-0006228
Jan. 16, 2020   (KR) .................. 10-2020-0006215

(51) Int. Cl.
*B01J 20/26*    (2006.01)
*B01J 20/30*    (2006.01)

(52) U.S. Cl.
CPC ........... *B01J 20/267* (2013.01); *B01J 20/261* (2013.01); *B01J 20/3021* (2013.01); *B01J 20/3078* (2013.01); *B01J 2220/68* (2013.01)

(58) Field of Classification Search
CPC .... B01J 20/267; B01J 20/261; B01J 20/3021; B01J 20/3078; B01J 2220/68;
(Continued)

(56) References Cited

U.S. PATENT DOCUMENTS 537,316 A * 4/1895 Stich et al.
5,453,323 A   9/1995 Chambers et al.
(Continued)

FOREIGN PATENT DOCUMENTS

CN    107406562 A    11/2017
CN    107709415 A    2/2018
(Continued)

OTHER PUBLICATIONS

Zohuriaan-Mehr et al., Iranian Polymer Journal 2008, 17,6, 451-477 (Year: 2008).*
(Continued)

*Primary Examiner* — Samir Shah
*Assistant Examiner* — Jordan W Taylor
(74) *Attorney, Agent, or Firm* — Lerner David LLP

(57) ABSTRACT

The present disclosure relates to: a super absorbent polymer having a rapid absorption rate and maintaining elasticity even in a condition of being pressed multiple times, thereby having excellent dryness characteristic; and a preparation method therefor. The super absorbent polymer of the present disclosure exhibits excellent performance for use in hygiene materials such as diapers.

9 Claims, 1 Drawing Sheet

(58) Field of Classification Search
CPC ..... B29B 7/428; B29B 2009/125; B29B 9/12;
B29B 9/16; B29B 9/06; C08F 2/50; C08F
2/44; C08F 220/06; C08F 20/18; C08F
2810/20; C08J 3/075; C08J 3/12; C08J
3/24; C08J 3/245; C08J 9/224; C08J
9/08; C08J 9/22; C08J 2201/026; C08J
2203/02; C08J 2205/02; C08J 2333/02;
C08L 33/04; C08L 33/08; A61L 15/60;
A41B 13/04; A61F 13/15
See application file for complete search history.

(56) References Cited

U.S. PATENT DOCUMENTS

| | | | |
|---|---|---|---|
| 5,856,370 | A | 1/1999 | Chmelir |
| 9,533,433 | B2 * | 1/2017 | Torii ................... B29B 9/12 |
| 9,700,873 | B2 | 7/2017 | Lee et al. |
| 2005/0137546 | A1 | 6/2005 | Joy et al. |
| 2011/0301303 | A1 | 12/2011 | Kim et al. |
| 2012/0220733 | A1 | 8/2012 | Machida et al. |
| 2013/0026412 | A1 | 1/2013 | Machida et al. |
| 2015/0240013 | A1 | 8/2015 | Matsumoto et al. |
| 2016/0096944 | A1 | 4/2016 | Wattebled et al. |
| 2016/0318002 | A1 | 11/2016 | Lee et al. |
| 2018/0050321 | A1 | 2/2018 | Lee et al. |
| 2018/0056274 | A1 | 3/2018 | Lee et al. |
| 2018/0185820 | A1 | 7/2018 | Tada et al. |
| 2018/0298132 | A1 | 10/2018 | Yorino et al. |
| 2019/0001302 | A1 * | 1/2019 | Shuto ................... A61L 15/24 |
| 2019/0077924 | A1 | 3/2019 | Lee et al. |
| 2019/0217272 | A1 | 7/2019 | Hong et al. |
| 2019/0308170 | A1 | 10/2019 | Heo et al. |

FOREIGN PATENT DOCUMENTS

| | | | | |
|---|---|---|---|---|
| EP | 0530438 | A1 | 3/1993 | |
| EP | 0629411 | A1 | 12/1994 | |
| EP | 3040362 | A1 | 7/2016 | |
| EP | 3070107 | A1 | 9/2016 | |
| EP | 3202823 | A1 | 8/2017 | |
| EP | 3249001 | A1 | 11/2017 | |
| EP | 3260485 | A1 | 12/2017 | |
| EP | 3279238 | A1 | 2/2018 | |
| EP | 3318324 | A1 | 5/2018 | |
| EP | 3412709 | A1 | 12/2018 | |
| EP | 3415550 | A1 | 12/2018 | |
| JP | H03174414 | A | 7/1991 | |
| JP | H0696619 | B2 | 11/1994 | |
| JP | H07088171 | A | 4/1995 | |
| JP | H09507085 | A | 7/1997 | |
| JP | 2001247683 | A | 9/2001 | |
| JP | 2007514833 | A | 6/2007 | |
| JP | 2015199958 | A | 11/2015 | |
| KR | 20110134333 | A | 12/2011 | |
| KR | 20150040884 | A | 4/2015 | |
| KR | 20160112220 | A | 9/2016 | |
| KR | 20160149235 | A | 12/2016 | |
| KR | 20170100395 | A * | 9/2017 | ............ B01J 20/267 |
| KR | 20170132799 | A | 12/2017 | |
| KR | 20180067942 | A | 6/2018 | |
| KR | 20180076272 | A | 7/2018 | |
| KR | 20180092841 | A | 8/2018 | |
| KR | 20180112110 | A | 10/2018 | |
| WO | 2005063313 | A1 | 7/2005 | |
| WO | 2011034146 | A1 | 3/2011 | |
| WO | WO-2011040530 | A1 * | 4/2011 | .............. B01J 20/26 |
| WO | 2015163508 | A1 | 10/2015 | |
| WO | WO2016085123 | A1 * | 6/2016 | ................ C08F 2/10 |
| WO | WO-2016105119 | A1 * | 6/2016 | ........... B02C 18/302 |
| WO | 2016148397 | A1 | 9/2016 | |

OTHER PUBLICATIONS

Lee et al. KR20170100395A English Translation (Year: 2017).*
Lee et al. WO2016085123A1 English Translation (Year: 2016).*
Nakatsuru et al. WO2011040530A1 English Machine Translation (Year: 2011).*
International Search Report for Application No. PCT/KR2020/000852 dated May 4, 2020, 3 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.
Search Report European Application No. 20740914.5 dated Aug. 24, 2021. 2 pgs.
Third Party Observation for Application No. PCT/KR2020/000852, dated May 17, 2021, 10 pages.
Search Report dated Jun. 21, 2022 from the Office Action for Chinese Application No. 202080003843.0 issued Jun. 27, 2022, 3 pages.

* cited by examiner

SUPER ABSORBENT POLYMER AND METHOD FOR PREPARING SAME

CROSS-REFERENCE TO RELATED APPLICATION(S)

The present application is a national phase entry under 35 U.S.C. § 371 of International Application No. PCT/KR2020/000852, filed on Jan. 17, 2020, which claims priority to Korean Patent Application No. 10-2019-0006228 filed on Jan. 17, 2019 and Korean Patent Application No. 10-2020-0006215 filed on Jan. 16, 2020, the disclosures of which are incorporated herein by reference in their entirety.

BACKGROUND OF THE INVENTION

(a) Field of the Invention

The present disclosure relates to a super absorbent polymer and a method for preparing the same.

(b) Description of the Related Art

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. For these applications, the super absorbent polymer should exhibit a high moisture absorbency, and it should not release the absorbed water even in the external pressure, and additionally it should well retain the shape even in a state where the volume is expanded (swelled) by absorbing water, and thereby exhibit excellent liquid permeability.

Recently, as hygiene materials such as a diaper or a sanitary napkin become thinner, super absorbent polymers are required to have higher absorption performance. Among these, improving both a centrifuge retention capacity and an absorbency under load which are conflicting physical properties, improving a liquid permeability, and so on, have become an important task.

In addition, pressure can be applied to hygiene materials such as diapers or sanitary napkins due to the weight of the user. In particular, when a super absorbent polymer applied to sanitary materials such as diapers or sanitary napkins absorbs liquid and then pressure is applied due to the weight of the user, a rewetting phenomenon where some liquid absorbed in the super absorbent polymer again leak out, and the phenomenon of urine leakage can occur.

For this purpose, the conventional super absorbent polymer uses a method of lowering the degree of internal crosslinking and increasing the degree of surface crosslinking. According to this method, however, the absorption rate may be increased, but after the super absorbent polymer is swollen by the absorbed liquid, the liquid is present on the surface of the super absorbent polymer, which causes a decrease in wearing feeling, a skin rash or the like.

As described above, the dryness is required so that no liquid is present on the surface after the super absorbent polymer absorbs the liquid. Therefore, there is a need to develop a super absorbent polymer having excellent dryness even under a condition of being pressed multiple times, without impairing the absorption performance and absorption rate of the super absorbent polymer.

SUMMARY OF THE INVENTION

Technical Problem

It is one object of the present disclosure to provide a super absorbent polymer having a rapid absorption rate and maintaining elasticity even under a condition of being pressed multiple times, thereby having excellent dryness characteristics; and a preparation method thereof.

Technical Solution

In order to achieve the above object, according to one aspect of the present disclosure, there is provided a super absorbent polymer in which a recovery rate of the super absorbent polymer calculated by the following Equation 1 is 85% or more:

$$\text{Recovery rate (\%)} = \text{Fourth resilience value} / \text{First resilience value} \times 100 \quad \text{[Equation 1]}$$

in the Equation 1, the first resilience value is a modulus (unit: Kpa) of the super absorbent polymer which is measured after 2 g of a super absorbent polymer is swollen in 200 mL of physiological saline (0.9 wt % NaCl) for 1 hour under no pressure, loaded into a DMA (Dynamic Mechanical Analysis) measuring device, pressed at room temperature (25° C.) under 0.72 psi for 5 minutes, and then pressure-released and allowed to stand for 10 minutes, and the fourth resilience value is the modulus (unit: Kpa) of the super absorbent polymer, which is measured for the fourth time after the process of measuring the first resilience value and then pressing again to measure the resilience value is further repeated three times in the same manner.

According to another aspect of the present disclosure, there is provided a method for preparing a super absorbent polymer comprising the steps of:

polymerizing a monomer composition including an acrylic acid-based monomer having at least partially neutralized acidic groups, a foaming agent, an internal crosslinking agent, and a polymerization initiator to form a hydrogel polymer;

chopping the hydrogel polymer through a chopper containing two or more hole plates arranged in series;

drying, pulverizing and classifying the chopped hydrogel polymer to form a base polymer; and further crosslinking the surface of the base polymer powder in the presence of a surface crosslinking agent to form a surface crosslinked layer.

Advantageous Effects

As described above, according to the super absorbent polymer of the present disclosure and the preparation method thereof, a super absorbent polymer having a rapid absorption rate and maintaining elasticity even in a condition of being pressed multiple times, thereby having excellent dryness characteristics; and a preparation method thereof can be provided.

Accordingly, the super absorbent polymer of the present disclosure is preferably used for hygiene materials such as diapers, and thus can exhibit excellent performance.

DETAILED DESCRIPTION OF THE EMBODIMENTS

Figure 1:
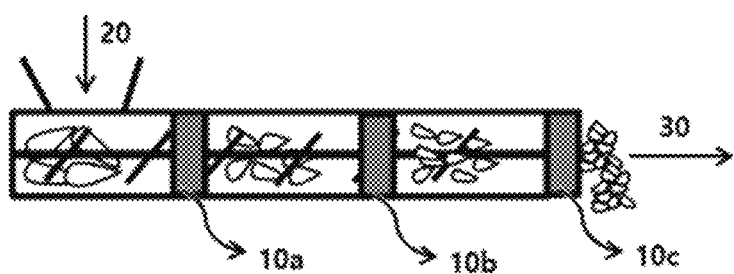
FIG. 1 is a schematic diagram showing a chopper according to an embodiment of the present disclosure.

Since a variety of modification may be made to the invention and the invention may have various forms, its specific examples are illustrated and will be described in detail below. However, it should be understood that this is not intended to limit the invention to particular forms disclosed herein, and the invention compasses all modifications, equivalents or alternatives thereof without departing the spirit and technical scope of the present disclosure.

As used herein, "polymer" or "super absorbent polymer" refers to a state in which an acrylic acid-based monomer is polymerized, and may encompass those of all moisture content ranges or particle diameter ranges. Among the polymers, a polymer having moisture content of about 40 wt % or more after polymerized and before dried may be designated as hydrogel polymer.

Further, "base polymer" or "base polymer powder" is made in the form of powder by drying and pulverizing the polymer, and means a polymer before performing the surface crosslinking step described later.

Hereinafter, a super absorbent polymer and a method for preparing the same according to one embodiment of the present disclosure will be described.

In order to improve the water absorption performance of the super absorbent polymer, a method of increasing the surface area of the super absorbent polymer is being studied. In order to increase the surface area of the super absorbent polymer, a method of using a foaming agent during polymerization of acrylic acid monomers is known, but excessive use of the foaming agent can result in gel strength and density reduction of the super absorbent polymers, which can cause problems in distribution and storage. As another method, there is a method of reducing the size of the particles through coarse pulverization of the hydrous gel polymer, but when excessive shearing force is applied during coarse pulverization, there are problems that the physical properties of the super absorbent polymer are deteriorated or the process of coarse pulverization is difficult.

Therefore, the present inventors have found the fact that the gel strength of the hydrogel polymer can be maintained and the absorption rate can be improved, by adjusting the process of the coarse pulverization step after polymerization of the hydrogel polymer resin, thereby completing the present disclosure.

The super absorbent polymer according to one aspect of the present disclosure is characterized in that the recovery rate of the super absorbent polymer calculated by the following Equation 1 is 85% or more:

Recovery rate (%)=Fourth resilience value/First resilience value*100 [Equation 1]

in the Equation 1, the first resilience value is a modulus (unit: Kpa) of the super absorbent polymer which is measured after 2 g of a super absorbent polymer is swollen in 200 mL of physiological saline (0.9 wt % NaCl) for 1 hour under no pressure, loaded into a DMA (Dynamic Mechanical Analysis) measuring device, pressed at room temperature (25° C.) under 0.72 psi for 5 minutes, and then pressure-released and allowed to stand for 10 minutes, and the fourth resilience value is the modulus (unit: Kpa) of the super absorbent polymer, which is measured for the fourth time after the process of measuring the first resilience value and then pressing again to measure the resilience value is further repeated three times in the same manner.

The recovery rate takes into account the use environment in which pressure is applied in response to various changes in posture, such as when the user sits up, lies, or lays down when a product such as a diaper containing a super absorbent polymer is actually used, and it shows numerically so that the degree of elasticity recovery of the super absorbent polymer can be quantitatively evaluated under such a pressed environment.

The higher the recovery rate means that the elasticity of the super absorbent polymer can be maintained even under the condition of being pressed multiple times. In the super absorbent polymer prepared according to the preparation method of the present disclosure, the recovery rate of the super absorbent polymer calculated by Equation 1 may be 85% or more, 88% or more, or 90% or more. The closer the recovery rate is to 100%, the more preferable it is. The recovery rate may be, for example, 100% or less, or 98% or less, or 95% or less.

Further, the super absorbent polymer of the present disclosure has a first resilience value of 90 Kpa or more, or 92 Kpa or more, or 93 Kpa or more, and 100 Kpa or less, or 99 Kpa or less, or 98 Kpa or less, which can exhibit a high initial elastic modulus.

Further, the super absorbent polymer as described above may have an absorption rate (vortex) of 40 seconds or less as measured according to the measurement method of Vortex. The absorption rate refers to the time during which the vortex of the liquid disappears due to fast absorption when the super absorbent polymer is added to a physiological saline solution and stirred. This represents the rapid absorption capacity of the super absorbent polymer. The concrete measurement method of Vortex will be further specified in the following embodiments. The absorption rate of the super absorbent polymer may be 40 seconds or less, or 35 seconds or less, or 30 seconds or less, or 27 seconds or less, or 25 seconds or less, and 10 seconds or more, or 15 seconds or more, or 20 seconds or more.

The super absorbent polymer may include a base polymer containing a crosslinked polymer of an acrylic acid-based monomer having at least partially neutralized acidic groups and an internal crosslinking agent; and a surface crosslinking layer formed on the base polymer by further crosslinking the surface of the base polymer in the presence of a surface crosslinking agent.

The super absorbent polymer of the present disclosure as described above may be prepared according to a preparation method described later, without being limited thereto.

The method for preparing a super absorbent polymer according to another aspect of the present disclosure includes the steps of: polymerizing a monomer composition including an acrylic acid-based monomer having at least partially neutralized acidic groups, a foaming agent, an internal crosslinking agent, and a polymerization initiator to form a hydrogel polymer; chopping the hydrogel polymer through a chopper containing two or more hole plates arranged in series; drying, pulverizing and classifying the chopped hydrogel polymer to form a base polymer; and further crosslinking the surface of the base polymer powder in the presence of a surface crosslinking agent to form a surface crosslinked layer.

In the method for preparing a super absorbent polymer according to the present disclosure, since chopping is performed by passing through a chopper containing two or more hole plates arranged in series in the step of coarsely pulverizing the hydrogel polymer after polymerization, coarse pulverization can be effectively performed without applying excessive shearing force, so that the gel strength of the hydrogel polymer can be maintained and the absorption rate can be improved.

Conventionally, in order to maintain the gel strength of a hydrogel polymer, a technique of performing pulverization to a size smaller than the particle size usually produced when coarsely pulverized using at least one of a foaming agent or a surfactant during polymerization so that the average particle diameter is 1.0 mm to 2.0 mm has been disclosed.

However, the above method is a method of forming pores only by chemical foaming. As such, the super absorbent polymer particles containing pores formed only by chemical foaming have a problem that the strength of the particles after drying is weakened and the particles are easily cracked, and there is a disadvantage that the resilience is not good. In contrast, the preparation method of the present disclosure has solved the above-mentioned problems by chopping through a chopper containing two or more hole plates arranged in series.

On the other hand, the preparation method of the present disclosure does not eliminate the use of a foaming agent or a surfactant during polymerization of the hydrogel polymer, and an additional surfactant can be used during the polymerization of the functional gel polymer while performing the two stage chopping procedure with a small amount of foaming agent.

Hereinafter, the preparation method will be described in detail for each step.

First, the acrylic acid-based monomer constituting the hydrogel polymer may be any monomer usually used for preparing a super absorbent polymer. As a non-limiting example, the acrylic acid-based monomer may be a compound represented by the following Chemical Formula 1:

$$R_1\text{—COOM}^1 \qquad \text{[Chemical Formula 1]}$$

in Chemical Formula 1, $R_1$ is an alkyl group having 2 to 5 carbon atoms containing an unsaturated bond, and $M^1$ is a hydrogen atom, a monovalent or divalent metal, an ammonium group or an organic amine salt.

Preferably, the acrylic acid-based monomer may be one or more selected from the group consisting of acrylic acid, methacrylic acid, and monovalent or divalent metal salts, ammonium salts and organic amine salts of these acids.

Here, the acrylic acid-based monomer may be those having at least partially neutralized acidic groups. Preferably, those in which the acrylic acid-based monomer is partially neutralized with a basic substance such as sodium hydroxide, potassium hydroxide, ammonium hydroxide or the like can be used. In this case, the degree of neutralization of the acrylic acid-based monomer may be about 40 to about 95 mol %, or about 40 to about 80 mol %, or about 45 to about 75 mol %. The range of the degree of neutralization may vary depending on the final physical properties. However, an excessively high degree of neutralization causes the neutralized monomers to be precipitated, and thus polymerization may not readily occur, whereas an excessively low degree of neutralization not only greatly deteriorates the absorbency of the polymer but also endows the polymer with hard-to-handle properties, like elastic rubber.

Further, the concentration of the acrylic acid monomer in the monomer composition may be properly adjusted, in consideration of a polymerization time and reaction conditions, and preferably, the concentration may be 20 to 90% by weight, or 40 to 65% by weight. This concentration range may be advantageous for using gel effect phenomenon occurring in the polymerization reaction of a high-concentration aqueous solution to eliminate a need for removing the unreacted monomer after the polymerization and also for improving pulverization efficiency in pulverization process of the polymer described below. However, if the concentration of the monomer is too low, the yield of the super absorbent polymer may become low. On the contrary, if the concentration of the monomer is too high, there is a process problem that a part of the monomers is precipitated, or pulverization efficiency is lowered upon pulverization of the polymerized hydrogel polymer, and the physical properties of the super absorbent polymer may be reduced.

As the internal crosslinking agent, any compound can be used as long as it enables introduction of a crosslink bond upon polymerization of the acrylic acid monomer. Non-limiting examples of the internal crosslinking agent may include multifunctional crosslinking agents, such as N,N'-methylenebisacrylamide, trimethylolpropane tri(meth)acrylate, ethylene glycol di(meth)acrylate, polyethylene glycol (meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto.

Such an internal crosslinking agent may be added at a concentration of about 0.001 to 1% by weight based on the monomer composition. That is, when the concentration of the internal crosslinking agent is too low, the absorption rate of the polymer is lowered and the gel strength may be weakened, which is not preferable. Conversely, when the concentration of the internal crosslinking agent is too high, the absorption capacity of the polymer is lowered, which may be undesirable as an absorber.

As the polymerization initiator, a polymerization initiator commonly used for the preparation of a super absorbent polymer can be included. As a non-limiting example, the polymerization initiator may be a thermal polymerization initiator or a photo-polymerization initiator, etc. depending on a polymerization method. In particular, the thermal polymerization initiator may be used. However, even in the case of performing the photo-polymerization method, a certain amount of heat is generated by ultraviolet irradiation or the like. Further, a certain amount of heat may be generated with the progress of exothermic polymerization reaction. Therefore, the thermal polymerization initiator may be further included.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), and the like. Further, examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, 4,4-azobis-(4-cyanovaleric acid) and the like. More various thermal polymerization initiators are well disclosed in "Principle of Polymerization" written by Odian, (Wiley, 1981), p 203, which may be incorporated herein by reference.

The photo-polymerization initiator may be, for example, one or more compounds selected from the group consisting of benzoin ether, dialkyl acetophenone, hydroxyl alkylketone, phenyl glyoxylate, benzyl dimethyl ketal, acyl phosphine and α-aminoketone. As the specific example of acyl phosphine, commercially available Lucirin TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, which may be incorporated herein by reference.

Such polymerization initiator may be added at a concentration of about 0.001 to 1% by weight with respect to the monomer composition. That is, if the concentration of the polymerization initiator is too low, the polymerization rate becomes low and a large amount of residual monomers may be extracted from the final product, which is not preferable. On the contrary, if the concentration of the polymerization initiator is too high, a polymer chain making up a network may become short, and thus, the physical properties of polymer may be degraded such as increase in the content of water-soluble components and decrease in absorbency under pressure, which is not preferable.

According to one embodiment of the present disclosure, the monomer composition includes a foaming agent.

The foaming agent acts to cause foaming during polymerization to produce pores in the hydrogel polymer, thereby increasing the surface area. As the foaming agent, a carbonate can be used. As an example, sodium bicarbonate, sodium carbonate, potassium bicarbonate, potassium carbonate, calcium bicarbonate, calcium carbonate, magnesiumbicarbonate or magnesium carbonate can be used.

The foaming agent is preferably used in an amount of 500 ppmw or less based on the weight of the acrylic acid monomer. The less the amount of the foaming agent used, the better the gel strength. When the amount of the foaming agent used is greater than 500 ppmw, the gel strength may be weakened, so it is preferable to use at 500 ppmw or less. For example, the foaming agent may be used in an amount of 450 ppmw or less, or 400 ppmw or less, or 350 ppmw or less, or 300 ppmw or less. The lower limit of the amount of the foaming agent used is not particularly limited, but for effective foaming, for example, it can be used in an amount of 10 ppmw or more, 50 ppmw or more, or 100 ppmw or more.

According to an embodiment of the present disclosure, the monomer composition can further contain a surfactant in order to develop the porous structure of the superabsorbent polymer and further improve the absorption rate. As the above-mentioned surfactant, an anionic surfactant or a nonionic surfactant can be used.

Examples of such anionic surfactants may be one or more selected from the group consisting of sodium dodecyl sulfate, ammonium lauryl sulfate, sodium laureth sulfate, dioctyl sodium sulfosuccinate, perfluorooctane sulfonate, perfluorobutane sulfonate, alkyl-aryl ether phosphate, alkyl ether phosphate, sodium myreth sulfate and carboxylate salt.

Examples of the nonionic surfactants may be one or more selected from the group consisting of fatty acid ester, sorbitan trioleate, polyethoxylated sorbitan monooleate (product name: TWEEN 80), sorbitan monooleate (product name: SPAN 80) and sugar ester (product name: S-570).

When the monomer composition further includes a surfactant, the total use amount of the surfactant containing the anionic surfactant and the nonionic surfactant may be included at a concentration of 100 ppmw or less based on the total weight of the acrylic acid monomer. More specifically, it may be included at a concentration of 100 ppmw or less, or 70 ppmw or less, and 1 ppmw or more, or 5 ppmw or more, or 10 ppmw or more, or 20 ppmw or more, or 30 ppmw or more. When the concentration of the surfactant is higher than 100 ppmw, the other physical properties of the super absorbent polymer such as absorbency under load, gel strength, or surface tension may be lowered, and when the concentration of the surfactant is too low, the effect of increasing the absorption rate due to the addition of the surfactant may become insufficient.

Meanwhile, in the method of preparing a super absorbent polymer according to the present disclosure, since the gel strength can be maintained without applying excessive shearing force chopping the hydrogel polymer through a chopper including two or more hole plates arranged in series, it is possible to achieve improved absorption rate while compensating for the drawbacks caused by the use of the surfactant such as a decrease in surface tension by including only a small amount of 100 ppmw or less even if the surfactant is not included or included.

In addition, the monomer composition may further contain additives such as a thickener, a plasticizer, a preservation stabilizer, and an antioxidant, if necessary.

And, the monomer composition may be prepared in the form of a solution in which the raw materials such as the above-mentioned monomers are dissolved in a solvent. In this case, as the usable solvent, any solvent may be used without limitations in the constitution, as long as it is able to dissolve the above raw materials. Example of the solvent that can be used include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

The formation of the hydrogel polymer through polymerization of the monomer composition can be carried out by a conventional polymerization method, and the process is not particularly limited. As a non-limiting example, the polymerization process may be largely classified into a thermal polymerization and a photo-polymerization depending on a polymerization energy source. The thermal polymerization may be performed in a reactor like a kneader equipped with agitating spindles, and the photo-polymerization can be carried out in a reactor equipped with a movable conveyor belt.

As an example, the monomer composition is injected into a reactor like a kneader equipped with the agitating spindles, and thermal polymerization is performed by providing hot air thereto or heating the reactor, to thereby obtain the hydrogel polymer. In this case, the hydrogel polymer, which is discharged from the outlet of the reactor according to the type of agitating spindles equipped in the reactor, can be obtained into a particle having several millimeters to several centimeters. Specifically, the resulting hydrogel polymer may be obtained in various forms according to the concentration of the monomer composition injected thereto, the injection speed, or the like, and a hydrogel polymer having a (weight average) particle size of 2 to 50 mm may be generally obtained.

As another example, when the photo-polymerization of the monomer composition is carried out in a reactor equipped with a movable conveyor belt, the hydrogel polymer may be obtained in the form of a sheet. In this case, the thickness of the sheet may vary according to the concentration of the monomer composition injected thereto and the injection speed. Usually, the sheet is preferably controlled to have a thickness of 0.5 cm to 5 cm in order to uniformly polymerize the entire sheet and also secure production speed.

In this case, the hydrogel polymer obtained by the above-mentioned method may have a water content of 40 to 80% by weight. Meanwhile, the "water content" as used herein means a weight occupied by moisture with respect to a total amount of the hydrogel polymer, which may be the value obtained by subtracting the weight of the dried polymer from the weight of the hydrogel polymer. Specifically, the water content is defined as a value calculated by measuring the weight loss due to evaporation of water in the polymer during the drying process of increasing the temperature of the polymer with infrared heating. At this time, the water content is measured under the drying conditions determined as follows: the drying temperature is increased from room temperature to about 180° C., and then the temperature is maintained at 180° C., and the total drying time is set as 20 minutes, including 5 minutes for the temperature rising step.

Next, the step of chopping the hydrogel polymer through a chopper including two or more hole plates arranged in series is carried out.

A chopper is a device that performs pulverization by a method in which an object, that is, a hydrogel polymer is charged into an inlet, and pushed out through a hole plate in which a number of holes having a certain size are formed. At this time, the extruder used for pushing out the hydrogel polymer may be a single or multiple screw type extruder.

When the coarse pulverization is performed by pushing out the hydrogel polymer to a hole plate as described above, a certain pressure is applied to the hydrogel polymer. Since the original gel strength and morphology of the hydrogel polymer are deformed by such pressure, the physical properties of the polymer after performing the coarse pulverization step may be changed.

That is, by the structure and operating principle of the chopper, the super absorbent polymer is pressed at the front end of the hole plate, and the pressure is released while passing through the hole plate, and the super absorbent polymer, that is, the hydrogel, expands. Since the gel strength and morphology of the hydrogel polymer are deformed during the compression and expansion process, the physical properties of the polymer after performing the coarse pulverization step are changed.

In this regard, there is known a method of controlling the physical properties of a hydrogel polymer by adjusting the diameter or morphology of the hole in the hole plate or by performing a coarse pulverization step using a plurality of choppers. However, there is a limit to improving the physical properties of the hydrogel polymer even by the above method.

In the preparation method of the present disclosure, it has been found that by connecting the hole plates in series in one chopper, continuous chopping is performed while shortening the pressing and expansion interval for the hydrogel polymer in the chopping step, whereby the reduction in gel strength is small, the elasticity is excellent, and the absorption rate is maintained, so that the super absorbent polymer can exhibit optimized physical properties.

That is, according to the method for producing a super absorbent polymer of the present disclosure, the process in which the hydrogel polymer coarsely pulverized through the first hole plate continuously are passed and coarsely pulverized through the next hole plate is repeated, whereby a super absorbent polymer having a resilience and a recovery modulus different from that of the super absorbent polymer particles subjected to a conventional chopping process can be obtained.

Figure 2:
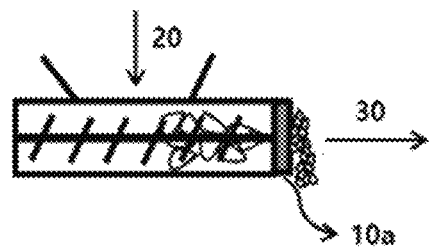
FIG. 2 is a schematic diagram showing a chopper according to the prior art.

FIG. 1 is a schematic view showing a chopper according to one embodiment of the present disclosure, and FIG. 2 is a schematic view showing a chopper according to the prior art.

Referring to FIG. 1, the chopper used in the preparation method of the present disclosure includes two or more hole plates 10a, 10b and 10c, and the two or more hole plates are connected in series. More specifically, the hydrogel polymer is charged into the chopper via an inlet 20 and is coarsely pulverized while being pushed out to the first hole plate 10a by a screw. The hydrogel polymer that has passed through the first hole plate 10a is secondarily coarsely pulverized while being continuously pushed out to the second hole plate 10b. The hydrogel polymer that has passed through the second hole plate 10b finally passes through the last hole plate 10c and is discharged to the outside of the chopper.

On the other hand, FIG. 1 shows that the chopper contains three hole plates, but the present disclosure is not limited thereto, and it may include various numbers of hole plates, such as two or more, for example, 2 to 5, or 2 to 4, or 2 to 3.

According to one embodiment of the present disclosure, when the hole plate closest to the inlet is the first plate and then designated in order, it is desirable that the average diameter of the hole plate becomes smaller as it moves away from the inlet. For example, the average diameter of the holes of the first hole plate may be 16 to 18 mm, and the average diameter of the holes of the second hole plate may be smaller than this, which may be 12 to 14 mm. Further, the average diameter of the hole of the last hole plate for discharging the hydrogel polymer to the outside may be 8 to 10 mm, but the present disclosure is not limited thereto.

In contrast, referring to FIG. 2 showing a conventional chopper, the hydrogel polymer charged into the chopper through the inlet 20 passes through the hole plate 10a only once and is discharged to the outside of the chopper, and the next step is performed.

Figure 3:
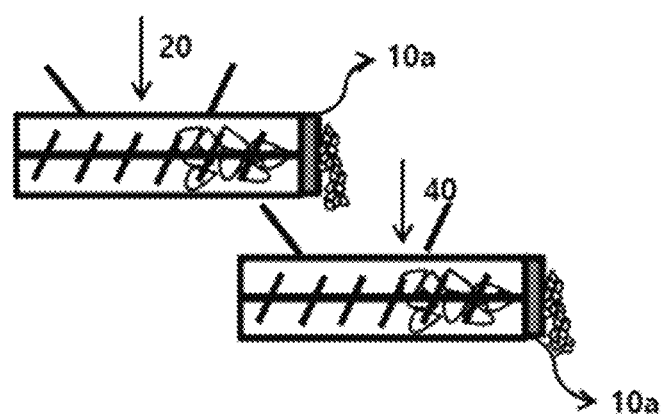
FIG. 3 is a schematic diagram showing a chopper according to the prior art.

Referring to FIG. 3 showing another conventional chopper, there is a method of connecting two or more choppers in multiple stages. In this case, the hydrogel polymer discharged through the hole plate 10a of the first chopper is re-charged into the inlet 40 of the second chopper and discharged to the outside of the chopper.

As described above, when the hydrogel polymer is coarsely pulverized by passing through two or more hole plates in order in accordance with the preparation method of the present disclosure, it is possible to form pores having a smaller size, for example, pores having a diameter of 100 μm or less due to continuous chopping than in the conventional coarse pulverization step of chopping using only one hole plate. Further, when using two choppers in two stages as shown in FIG. 3, since it takes a long time to move from the first stage to the second stage, there is a problem that the pore formation cannot be efficiently performed, and the absorption rate decreases. Therefore, the chopping method of the present disclosure using a chopper in which two or more hole plates are continuously included in the chopper as in the present disclosure may be more advantageous.

According to one embodiment of the present disclosure, in the chopping step, the hydrogel polymer can be chopped by further adding a polycarboxylic acid-based copolymer.

The polycarboxylic acid-based copolymer induces uniform pulverization of the polymer by lowering the load on the chopper due to the lubricating action, and it is possible to suppress the formation of water-soluble components during pulverization. Through this, it is possible to prepare a super absorbent polymer having high absorbency under pressure characteristics together with rapid absorption rate.

As one example, it is advantageous in terms of achieving the above-described effect that a random copolymer derived from hydrophilic monomers such as alkoxy polyalkylene glycol mono(meth)acrylic acid ester-based monomers (represented by methoxy polyethylene glycol monomethacrylate (MPEGMAA)) and (meth)acrylic acid ester-based monomers (represented by acrylic acid, (meth)acrylic acid, etc.) is used as the polycarboxylic acid-based copolymer.

And, to better achieve the effect due to the addition of the polycarboxylic acid-based copolymer, it is preferable that the polycarboxylic acid-based copolymer has a weight average molecular weight of 500 to 1,000,000 g/mol. More preferably, the weight average molecular weight is 1,000 to 500,000 g/mol, 10,000 to 100,000 g/mol, 20,000 to 90,000 g/mol, 30,000 to 80,000 g/mol, or 40,000 to 70,000 g/mol.

Further, the content of the polycarboxylic acid-based copolymer may be properly controlled according to the kind of the copolymer, reaction conditions, and the like. Preferably, the polycarboxylic acid-based copolymer may be mixed in an amount of 0.001 to 5 parts by weight based on 100 parts by weight of the hydrogel polymer. If the content of the polycarboxylic acid-based copolymer becomes too low, the above effect required in the present disclosure may not be sufficiently achieved. In contrast, excessive use of the polycarboxylic acid-based copolymer may deteriorate the function of the super absorbent polymer, resulting in a decrease in absorption properties or a decrease in surface tension and a decrease in powder flowability, which is not preferable.

Next, the chopped hydrogel polymer is dried, pulverized and classified to form a base polymer.

The drying temperature may be 50 to 250° C. When the drying temperature is less than 50° C., it is likely that the drying time becomes too long or the physical properties of the super absorbent polymer finally formed is deteriorated. When the drying temperature is higher than 250° C., only the surface of the polymer is excessively dried, and thus fine powder may be generated and the physical properties of the super absorbent polymer finally formed may be deteriorated. The drying may be more preferably carried out at a temperature of 150° C. to 200° C., and still more preferably at a temperature of 160° C. to 190° C. Meanwhile, the drying time may be 20 minutes to 15 hours, in consideration of the process efficiency and the like, but it is not limited thereto.

In the drying step, any drying method may be selected and used without limitation in the constitution if it is a method commonly used in the relevant art. Specifically, the drying step may be carried out by a method such as hot air supply, infrared irradiation, microwave irradiation or ultraviolet irradiation. When the drying step as above is finished, the water content of the polymer may be 0.05 to 10% by weight.

Next, a step of pulverizing the dried polymer obtained through such a drying step is carried out.

The polymer powder obtained through the pulverizing step may have a particle diameter of 150 to 850 μm. Specific examples of a pulverizing device that can be used to pulverize into the above particle diameter may include a ball mill, a pin mill, a hammer mill, a screw mill, a roll mill, a disc mill, a jog mill or the like, but it is not limited to the above-described examples.

Further, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of 150 to 850 μm is classified and only the polymer powder having such a particle diameter is subjected to the surface crosslinking reaction described later and finally commercialized.

Next, the surface of the base polymer powder is further crosslinked in the presence of a surface crosslinking agent, thereby preparing a super absorbent polymer.

More specifically, the base polymer powder can be heat-treated and surface-crosslinked in the presence of a surface crosslinking solution containing a surface crosslinking agent, thereby preparing a super absorbent polymer.

Here, the kind of the surface crosslinking agent contained in the surface crosslinking solution is not particularly limited. As a non-limiting example, the surface crosslinking agent may be at least one compound selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene carbonate, ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

In this case, the content of the surface crosslinking agent may be properly controlled according to the type of the surface crosslinking agent or reaction conditions, and preferably, the content may be controlled to 0.001 to 5 parts by weight based on 100 parts by weight of the base polymer. If the content of the surface crosslinking agent is too low, surface modification may not be properly performed to deteriorate physical properties of the final super absorbent polymer. On the contrary, if the surface crosslinking agent is excessively used, excessive surface crosslinking reaction may occur, and rather the absorption capability of the super absorbent polymer may be deteriorated, which is not preferable.

In addition, the surface crosslinking solution may further include at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide. The solvent may be included in an amount of 0.5 to 10 parts by weight based on 100 parts by weight of the base polymer.

Meanwhile, in order to perform the surface crosslinking, a method of placing the surface crosslinking solution and the base polymer into a reaction tank and mixing them, a method of spraying a surface crosslinking solution onto the base polymer, a method in which the base polymer and the surface crosslinking solution are continuously supplied in a continuously operating mixer and mixed, or the like can be used.

In addition, the surface crosslinking may be carried out at a temperature of 100 to 250° C., and may be continuously performed after the drying and pulverizing step proceeding at a relatively high temperature. At this time, the surface crosslinking reaction may be carried out for 1 to 120 minutes, or 1 to 100 minutes, or 10 to 60 minutes. That is, in order to prevent a reduction in physical properties due to damages of the polymer particles by excessive reaction while inducing the minimal surface crosslinking reaction, the surface modification step may be performed under the above-described conditions.

Then, in order to control the physical properties of the super absorbent polymer powder finally commercialized after the pulverization step as above, a separate step of classifying the polymer powder obtained after the pulverization depending on the particle size may be performed. By this classifying step, the super absorbent polymer having a particle size of 150 to 850 μm may be 90% by weight or more, or 92% by weight or more, or 95% by weight or more.

The super absorbent polymer prepared as described above may exhibit an improved absorption rate, and also maintain excellent properties including gel strength and various physical properties.

Hereinafter, preferred examples are presented to aid in understanding of the invention. However, these examples are for illustrative purposes only, and the scope of the invention is not intended to be limited thereby.

EXAMPLES

Example 1

8.6 g (80 ppmw based on the monomer) of 0.5 wt % IRGACURE 819 initiator diluted with acrylic acid and 12.3 g of 20 wt % polyethylene glycol diacrylate (PEGDA, Mw=400) diluted with acrylic acid were mixed to prepare a solution (solution A).

540 g of acrylic acid and the solution A were injected into a 2 L-volume glass reactor surrounded by a jacket through which a heating medium pre-cooled at 25° C. was circulated.

Then, 832 g of 25 wt % caustic soda solution (solution B) was slowly added dropwise to the glass reactor and mixed. After confirming that the temperature of the mixed solution increased to about 72° C. or higher by neutralization heat, the mixed solution was left until it was cooled. A neutralization degree of acrylic acid in the mixed solution thus obtained was about 70 mol %.

Meanwhile, 20 g of 5 wt % solution C diluted with sodium bicarbonate as a foaming agent was prepared. Then, when the temperature of the neutralized mixed solution was cooled to about 45° C., a solution C previously prepared was injected into the neutralized mixed solution and mixed.

Then, the above-prepared mixed solution was poured in a Vat-type tray (15 cm in width×15 cm in length) installed in a square polymerizer which had a light irradiation device installed at the top and was preheated to 80° C. The mixed solution was then subjected to light irradiation. It was confirmed that at about 20 seconds after light irradiation, gel was formed from the surface, and that at about seconds after light irradiation, polymerization occurred concurrently with foaming. Then, the polymerization reaction was performed for additional 2 minutes, and the polymerized sheet was taken out and cut into a size of 3 cm×3 cm.

Then, chopping was performed by using a chopper (however, including two hole plates, the average diameter of the holes of each hole plate is 18 mm and 14 mm in order) as shown in FIG. 1, thereby preparing the cut sheet as crumbs. The average particle size (diameter) of the prepared crumbs was 0.2 mm.

Then, the crumbs were dried in an oven capable of shifting airflow up and down. The crumbs were uniformly dried by flowing hot air at 180° C. from the bottom to the top for 15 minutes and from the top to the bottom for 15 minutes such that the dried crumbs had a water content of about 2 wt % or less. The dried crumbs were pulverized using a pulverizer and classified, thereby obtaining a base polymer having a size of 150 to 850 μm.

Subsequently, 100 g of the above-prepared base polymer was mixed with a crosslinking agent solution which was obtained by mixing 4.5 g of water, 1 g of ethylene carbonate, 0.05 g of Aerosil 200 (EVONIK) and 0.25 g of 20 wt % water-dispersed silica (Snowtex, ST-O) solution, and then surface crosslinking reaction was performed at 190° C. for 30 minutes. The resulting product was pulverized and then passed through a sieve to obtain a surface-crosslinked super absorbent polymer having a particle size of 150 to 850 μm. 0.1 g of Aerosil 200 was further mixed with the obtained super absorbent polymer by a dry method to prepare a super absorbent polymer.

Example 2

A super absorbent polymer was prepared in the same manner as in Example 1, except that a chopper including three hole plates (the average diameter of the holes of each hole plate was 18 mm, 14 mm and 12 mm in order) was used in Example 1.

Example 3

A super absorbent polymer was prepared in the same manner as in Example 1, except that sodium dodecylsulfate as a surfactant was added to the solution C so as to be 100 ppmw based on the total weight of the acrylic acid in Example 1.

Example 4

A super absorbent polymer was prepared in the same manner as in Example 2, except that sodium dodecylsulfate as a surfactant was added to the solution C so as to be 100 ppmw based on the total weight of the acrylic acid in Example 2.

Comparative Example 1

8.6 g (80 ppmw based on the monomer) of 0.5 wt % IRGACURE 819 initiator diluted with acrylic acid and 12.3 g of 20 wt % polyethylene glycol diacrylate (PEGDA, Mw=400) diluted with acrylic acid were mixed to prepare a solution (solution A).

540 g of acrylic acid and the solution A were injected into a 2 L-volume glass reactor surrounded by a jacket through which a heating medium pre-cooled at 25"C was circulated.

Then, 832 g of 25 wt % caustic soda solution (solution B) was slowly added dropwise to the glass reactor and mixed. After confirming that the temperature of the mixed solution increased to about 72° C. or higher by neutralization heat, the mixed solution was left until it was cooled. A neutralization degree of acrylic acid in the mixed solution thus obtained was about 70 mol %.

Then, the above-prepared mixed solution was poured in a Vat-type tray (15 cm in width×15 cm in length) installed in a square polymerizer which had a light irradiation device installed at the top and was preheated to 80° C. The mixed solution was then subjected to light irradiation. It was confirmed that at about 20 seconds after light irradiation, gel was formed from the surface, and that at about seconds after light irradiation, polymerization occurred concurrently with foaming. Then, the polymerization reaction was performed for additional 2 minutes, and the polymerized sheet was taken and cut into a size of 3 cm×3 cm.

Then, chopping was performed by using a chopper (two choppers connected in parallel, the average diameter of the hole of the hole plate of each chopper was 18 mm and 14 mm) as shown in FIG. 3, thereby preparing the cut sheet as crumbs. The average particle size (diameter) of the prepared crumbs was 0.4 mm.

Then, the crumbs were dried in an oven capable of shifting airflow up and down. The crumbs were uniformly dried by flowing hot air at 180° C. from the bottom to the top for 15 minutes and from the top to the bottom for 15 minutes such that the dried crumbs had a water content of about 2 wt % or less. The dried crumbs were pulverized using a pulverizer and classified, and a base polymer having a size of 150 to 850 µm was obtained.

Subsequently, 100 g of the above-prepared base polymer was mixed with a crosslinking agent solution which was obtained by mixing 4.5 g of water, 1 g of ethylene carbonate, 0.05 g of Aerosil 200 (EVONIK) and 0.25 g of 20 wt % water-dispersed silica (Snowtex, ST-O) solution, and then surface crosslinking reaction was performed at 190° C. for 30 minutes. The resulting product was pulverized and then passed through a sieve to obtain a surface-crosslinked super absorbent polymer having a particle size of 150 to 850 µm. 0.1 g of Aerosil 200 was further mixed with the obtained super absorbent polymer by a dry method to prepare a super absorbent polymer.

Comparative Example 2

8.6 g (80 ppmw based on the monomer) of 0.5 wt % IRGACURE 819 initiator diluted with acrylic acid and 12.3 g of 20 wt % polyethylene glycol diacrylate (PEGDA, Mw=400) diluted with acrylic acid were mixed to prepare a solution (solution A).

540 g of acrylic acid and the solution A were injected into a 2 L-volume glass reactor surrounded by a jacket through which a heating medium pre-cooled at 25° C. was circulated.

Then, 832 g of 25 wt % caustic soda solution (solution B) was slowly added dropwise to the glass reactor and mixed. After confirming that the temperature of the mixed solution increased to about 72° C. or higher by neutralization heat, the mixed solution was left until it was cooled. A neutralization degree of acrylic acid in the mixed solution thus obtained was about 70 mol %.

Meanwhile, 20 g of 5 wt % solution C diluted with sodium bicarbonate as a foaming agent was prepared. Then, when the temperature of the neutralized mixed solution was cooled to about 45° C., a solution C previously prepared was injected into the neutralized mixed solution and mixed.

Then, the above-prepared mixed solution was poured in a Vat-type tray (15 cm in width×15 cm in length) installed in a square polymerizer which had a light irradiation device installed at the top and was preheated to 80° C. The mixed solution was then subjected to light irradiation. It was confirmed that at about 20 seconds after light irradiation, gel was formed from the surface, and that at about 30 seconds after light irradiation, polymerization occurred concurrently with foaming. Then, the polymerization reaction was performed for additional 2 minutes, and the polymerized sheet was taken out and cut into a size of 3 cm×3 cm.

Then, chopping was performed by using a chopper (the average diameter of the holes of hole plate was 14 mm) as shown in FIG. 2, thereby preparing the cut sheet as crumbs. The average particle size (diameter) of the prepared crumbs was 0.55 mm.

Besides that, a super absorbent polymer was prepared in the same manner as in Comparative Example 1.

Comparative Example 3

In the chopping step of Comparative Example 2, chopping was performed by using a chopper (two choppers connected in parallel, the average diameter of the hole of the hole plate of each chopper was 18 mm and 14 mm) as shown in FIG. 3, thereby preparing the cut sheet as crumbs. The average particle size (diameter) of the prepared crumbs was 0.4 mm.

Besides that, a super absorbent polymer was prepared in the same manner as in Comparative Example 2.

Comparative Example 4

In the chopping step of Comparative Example 2, chopping was performed by using a chopper (however, three choppers connected in parallel, the average diameter of the hole of the hole plate of each chopper was 18 mm, 14 nm and 12 mm in order) as shown in FIG. 3, thereby preparing the cut sheet as crumbs. The average particle size (diameter) of the prepared crumbs was 0.3 mm.

Besides that, a super absorbent polymer was prepared in the same manner as in Comparative Example 2.

Comparative Example 5

In the chopping step of Comparative Example 1, chopping was performed by using a chopper (however, including two hole plates, the average diameter of the holes of each hole plate is 14 mm and 12 mm in order) as shown in FIG. 1, thereby preparing the cut sheet as crumbs. The average particle size (diameter) of the prepared crumbs was 0.3 mm.

Besides that, a super absorbent polymer was prepared in the same manner as in Comparative Example 1.

Comparative Example 6

A super absorbent polymer was prepared according to Example 2 of Korean Patent Application Publication No. 2018-0076272.

The conditions of the main steps of the Examples and Comparative Examples are summarized in Table 1 below.

TABLE 1

|  | Foaming agent (unit: ppmw)* | Surfactant (unit: ppmw)* | Chopping method |
|---|---|---|---|
| Example 1 | 500 | 0 | Chopping with two hole plates arranged in series in the chopper |
| Example 2 | 500 | 0 | Chopping with three hole plates placed in series in the chopper |
| Example 3 | 500 | 100 | Chopping with two hole plates arranged in series in the chopper |
| Example 4 | 500 | 100 | Chopping with three hole plates placed in series in the chopper |
| Comparative Example 1 | 0 | 0 | 2-stage chopping that connects two choppers |
| Comparative Example 2 | 500 | 0 | 1-stage chopping |
| Comparative Example 3 | 500 | 0 | 2-stage chopping that connects two choppers |
| Comparative Example 4 | 500 | 0 | 3-stage chopping that connects three choppers |
| Comparative Example 5 | 0 | 0 | Chopping with two hole plates arranged in series in the chopper |
| Comparative Example 6 | 1000 | 200 | 1-stage chopping |

*The contents of the foaming agent and the surfactant were calculated by the content (unit: ppmw) with respect to the total weight of the acrylic acid monomer.

Experimental Example

The physical properties of the super absorbent polymers prepared in Examples and Comparative Examples were evaluated by the following methods, and the results are shown in Table 2 below.

(1) Recovery Rate

A modulus (unit: Kpa) of the super absorbent polymer was measured after 2 g of a super absorbent polymer was swollen in 200 mL of a physiological saline (0.9 wt % NaCl) for 1 hour under no pressure, loaded into a DMA (Dynamic Mechanical Analysis) measuring device, pressed at room temperature (25° C.) under 0.72 psi for 5 minutes, and then pressure-released and allowed to stand for 10 minutes. Thereby, the first resilience value was obtained.

The process of measuring the first resilience value and then pressing again to measure the resilience value was further repeated three times in the same manner, and a total of four measurements were performed.

In addition, the recovery rate was measured by substituting the first resilience value and the fourth resilience value measured for the fourth time into the following Equation 1.

Recovery rate (%)=Fourth resilience value/First resilience value*100     [Equation 1]

(2) Absorption Rate (Vortex Time)

The absorption rate of the super absorbent polymers of Examples and Comparative Examples was measured in seconds according to the method described in International Publication WO 1987/003208.

Specifically, the absorption rate (or vortex time) was calculated by measuring in seconds the amount of time required for the vortex to disappear after adding 2 g of a super absorbent polymer to 50 mL of physiological saline solution at 23° C. to 24° C. and then stirring a magnetic bar (diameter 8 mm, length 31.8 mm) at 600 rpm.

The results of the measurement as described above are shown in Table 2 below.

TABLE 2

|  | First resilience value (unit: Kpa) | Second resilience value (unit: Kpa) | Third resilience value (unit: Kpa) | Fourth resilience value (unit: Kpa) | Recovery rate (%) | Vortex time (sec) |
|---|---|---|---|---|---|---|
| Example 1 | 95 | 94 | 92 | 85 | 89 | 33 |
| Example 2 | 93 | 92 | 89 | 79 | 85 | 24 |
| Example 3 | 98 | 93 | 90 | 88 | 90 | 30 |
| Example 4 | 92 | 90 | 85 | 81 | 88 | 23 |
| Comparative Example 1 | 93 | 88 | 82 | 75 | 81 | 57 |
| Comparative Example 2 | 75 | 67 | 62 | 58 | 77 | 40 |
| Comparative Example 3 | 80 | 65 | 60 | 55 | 69 | 32 |
| Comparative Example 4 | 73 | 63 | 54 | 40 | 55 | 25 |
| Comparative Example 5 | 95 | 92 | 90 | 86 | 91 | 56 |
| Comparative Example 6 | 73 | 70 | 64 | 55 | 75 | 41 |

Referring to Table 2, all of the super absorbent polymers of the present disclosure exhibited excellent resilience and an excellent absorption rate of 40 seconds or less. Accordingly, it is expected that a super absorbent polymer having excellent dryness characteristics can be provided by maintaining elasticity even under a condition of being pressed multiple times.

However, in the case of Comparative Examples 1 to 5 in which the chopping method of the present disclosure was not employed, it was found that the resilience was significantly decreased as the pressing was repeated, and the elasticity was not properly maintained in a pressed environment.

What is claimed is:

1. A method for preparing a super absorbent polymer comprising:
   polymerizing a monomer composition including an acrylic acid-based monomer having at least partially neutralized acidic groups, a foaming agent, an internal crosslinking agent, and a polymerization initiator to form a hydrogel polymer;
   chopping the hydrogel polymer through a chopper containing two or more hole plates arranged in series with a screw therethrough;
   drying, pulverizing and classifying the chopped hydrogel polymer to form a base polymer; and
   further crosslinking a surface of the base polymer powder in the presence of a surface crosslinking agent to form a surface crosslinked layer,
   wherein each of the two or more hole plates comprises a plurality of holes,
      wherein an average diameter of the plurality of holes of each successive hole plate becomes smaller with each successive hole plate in a direction away from an inlet to the screw;
      wherein the hydrogel polymer is pulverized while being pushed out of each hole plate by the screw while being continuously pushed out by the screw in subsequent hole plates in decreasing particle size, and
      wherein the super absorbent polymer has an absorption rate (vortex) of 40 seconds or less calculated by measuring in seconds an amount of time required for a vortex to disappear after adding 2 g of a super absorbent polymer to 50 mL of physiological saline solution at 23° C. to 24° C. and then stirring at 600 rpms.

2. The method for preparing the super absorbent polymer according to claim 1, wherein the foaming agent comprises one or more of sodium bicarbonate, sodium carbonate, potassium bicarbonate, potassium carbonate, calcium bicarbonate, calcium carbonate, magnesium bicarbonate or magnesium carbonate.

3. The method for preparing the super absorbent polymer according to claim 1, wherein the foaming agent is contained in an amount of 500 ppmw or less based on the weight of a acrylic acid-based monomer.

4. The method for preparing the super absorbent polymer according to claim 1, wherein the monomer composition further comprises a surfactant.

5. The method for preparing the super absorbent polymer according to claim 4, wherein the surfactant comprises one or more of sodium dodecyl sulfate, ammonium lauryl sulfate, sodium laureth sulfate, dioctyl sodium sulfosuccinate, perfluorooctane sulfonate, perfluorobutane sulfonate, alkylaryl ether phosphate, alkyl ether phosphate, sodium myreth sulfate or carboxylate salt.

6. The method for preparing the super absorbent polymer according to claim 1, wherein the chopping is performed by further adding a polycarboxylic acid-based copolymer.

7. The method for preparing the super absorbent polymer according to claim 6, wherein the polycarboxylic acid-based copolymer comprises one or more of alkoxy polyalkylene glycol mono(meth)acrylic acid ester-based monomers or (meth)acrylic acid ester-based monomers.

8. The super adsorbent polymer prepared according to the method of claim 1 in which a recovery rate of the super adsorbent polymer calculated by the following Equation 1 is 85% or more:

$$\text{Recovery rate (\%)} = \text{Fourth resilience value/first resilience value} * 100; \quad \text{[Equation 1]}$$

wherein in Equation 1, the first resilience value is a modulus (unit: Kpa) of the super adsorbent polymer which is measured after 2 g of the super adsorbent polymer is swollen in 200 mL of physiological saline (0.9 wt % NaCl) for 1 hour under no pressure, loaded into a DMA (Dynamic Mechanical Analysis) measuring device, pressed at room temperature (25° C.) under 0.72 psi for 5 minutes, and then released from pressure and allowed to stand for 10 minutes, and the fourth resilience value is the modulus (unit: Kpa) of the super adsorbent polymer, which is measured for the fourth time after the process of measuring the first resilience value and then pressing again to measure a resilience value, which is repeated three times in the same manner.

9. The super absorbent polymer according to claim 8, wherein the first resilience value is 90 Kpa or more.

* * * * *